United States Patent
Inui et al.

(10) Patent No.: US 8,008,226 B2
(45) Date of Patent: Aug. 30, 2011

(54) OIL-BASED THERMO-NEUTRAL REFORMING WITH A MULTI-COMPONENT CATALYST

(75) Inventors: Tomoyuki Inui, Dhahran (SA); Bashir Osama Dabbousi, Dhahran (SA); Shakeel Ahmed, Dhahran (SA); Fahad Ibrahim Al-Muhaish, Al-Khobar (SA); Mohammed Abdul Bari Siddiqui, Dhahran (SA)

(73) Assignees: Saudi Arabian Oil Company, Dhahran (SA); King Fahd University of Petroleum & Minerals, Dhahran (SA)

( * ) Notice: Subject to any disclaimer, the term of this patent is extended or adjusted under 35 U.S.C. 154(b) by 0 days.

(21) Appl. No.: 12/660,762

(22) Filed: Mar. 3, 2010

(65) Prior Publication Data
US 2010/0216633 A1    Aug. 26, 2010

Related U.S. Application Data

(62) Division of application No. 11/645,970, filed on Dec. 26, 2006, now Pat. No. 7,700,005.

(51) Int. Cl.
*B01J 23/10* (2006.01)
(52) U.S. Cl. .................... 502/241; 502/303
(58) Field of Classification Search .......... 502/303, 502/304, 241; 423/628
See application file for complete search history.

(56) References Cited

U.S. PATENT DOCUMENTS

| | | | |
|---|---|---|---|
| 7,351,393 B1 * | 4/2008 | Bayense et al. | 423/625 |
| 2005/0096215 A1 * | 5/2005 | Espinoza et al. | 502/302 |

* cited by examiner

*Primary Examiner* — Wayne Langel
(74) *Attorney, Agent, or Firm* — Abelman, Frayne & Schwab

(57) ABSTRACT

A method is provided for the thermo-neutral reforming of liquid hydrocarbon fuels which employs a Ni, $Ce_2O_3$, $La_2O_3$, $Pt^-ZrO_2$, Rh and Re catalyst having dual functionalities to achieve both combustion and steam reforming.

3 Claims, 3 Drawing Sheets

Seven Component Catalyst System supported on θ-alumina

Process Properties:

Catalyst = Ni-$Ce_2O_3$-$La_2O_3$-Pt-$ZrO_2$-Rh - Re (supported on θ-alumina)
Inlet temperature of feed hydrocarbon = 415 - 420°C
Reaction temperature at the steady state = 800 - 900°C
(No External Heat)
Gaseous hourly space velocity (GHSV) = 35,000 $h^{-1}$-70,000 $h^{-1}$
Conversion of hydrocarbon feed more than 97%
Oxygen/Carbon Ratio = 0.36-0.5
$H_2/CO+CO_2$ Ratio = 0:86-1.47
Products = $H_2/CO/CO_2/CH_4$ Hydrocarbon + Air / $O_2$ + $H_2O$
+
Hydrocarbon + Air / $O_2$ + $CO_2$

OIL-BASED THERMO-NEUTRAL REFORMING WITH A MULTI-COMPONENT CATALYST

This application is a divisional application of application Ser. No. 11/645,970 filed Dec. 26, 2006, now U.S. Pat. No. 7,700,005.

FIELD OF THE INVENTION

This invention relates to a thermo-neutral process for the reforming of petroleum-based liquid hydrocarbon fuels and, more specifically, to the use of a multi-component catalyst in said thermo-neutral reforming process.

BACKGROUND OF THE INVENTION

The current total worldwide annual production of hydrogen is over ½ trillion m³ per year. The need for even greater quantities of hydrogen is still a major bottleneck, especially with the new legislative requirements and pressure to produce ultra low sulfur fuels, while available oil resources become heavier with higher contents of sulfur and metals.

The need for additional hydrogen in refineries is clearly growing, currently at the rate of 6.3% per year, and will continue to grow at a rapid pace for the foreseeable future.

In addition, hydrogen-based fuel cells for automotive and stationary applications are gaining popularity for a variety of reasons, including their higher efficiencies and lower emissions. Nonetheless, using pure hydrogen as a fuel in automotive and residential applications faces many obstacles and has many limitations. The infrastructure to deliver hydrogen is inadequate, the refueling of gaseous hydrogen can be slow, and the storage of hydrogen is problematic. The alternatives to producing and using hydrogen range from futuristic solar energy based hydrogen generation to more pragmatic hydrocarbon reforming. Use of liquid/gaseous hydrocarbon fuels to generate hydrogen is being thought of as an immediate solution for large scale hydrogen production. Besides economics and ease of reforming, this option is seen as being more practical than utilizing the existing distribution network.

The conversion of hydrocarbon fuels to hydrogen can be carried out by several processes, including hydrocarbon steam reforming (HSR), partial oxidation reforming (POR), and auto thermal reforming (ATR). Hydrocarbon steam reforming involves the reaction of steam with the fuel in the presence of a catalyst to produce hydrogen and CO as given in equations (1) and (2) for methane, $CH_4$, and isooctane, $C_8H_{18}$ (2,2,4-trimethylpentane), which is used as a surrogate for gasoline. Since steam reforming is endothermic, some of the fuel must be burned and the heat transferred to the reformer via heat exchangers.

$$CH_4 + H_2O \approx CO + 3H_2, \Delta H°_{298} = +206.2 \text{ kJ/mol} \quad (1)$$

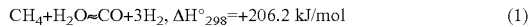

$$C_8H_{18} + 8H_2O \approx 8CO + 17H_2, \Delta H°_{298} = +1273.2 \text{ kJ/mol} \quad (2)$$

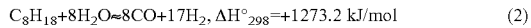

Partial oxidation involves the reaction of oxygen with fuel to produce hydrogen and CO as illustrated in equations (3) and (4), when the oxygen-to-fuel ratio is less than that required for total combustion, i.e., complete conversion to $CO_2$ and $H_2O$.

$$CH_4 + ½O_2 \approx CO + 2H_2, \Delta H°_{298} = -35.7 \text{ kJ/mol} \quad (3)$$

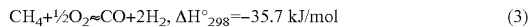

$$C_8H_{18} + 4O_2 \approx 8CO + 9H_2, \Delta H°_{298} = -158.1 \text{ kJ/mol} \quad (4)$$

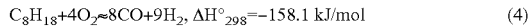

Partial oxidation can be conducted with a catalyst (catalytic partial oxidation) or without a catalyst (non-catalytic partial oxidation). The reaction rates are much higher for partial oxidation than for steam reforming, but the hydrogen yield per carbon in the fuel is lower. Non-catalytic partial oxidation requires reaction temperatures above 1000° C. to achieve rapid reaction rates. Although the reaction is exothermic, some of the fuel must be combusted because the amount of heat generated by the reaction is not sufficient to preheat the feed to achieve optimal rates. Recently, there has been interest in catalytic partial oxidation since it operates at lower temperatures than the non-catalytic route. The lower operating temperatures provide better control over the reaction, thus minimizing coke formation and allowing for a wider choice of materials of construction for the reactor.

Catalytic partial oxidation reforming of natural gas is being tested in pilot plants for gas to liquid (GTL) processes. In these cases, one of the advantages is that the syngas having a lower $H_2/CO$ molar ratio can be directly used for successive catalytic converters to produce synthetic liquid products. Although the large endothermic heat for the steam-reforming of natural gas is avoided by the exothermic partial oxidation heat, the hydrogen atoms in water, i.e., the source of cheap and plentiful hydrogen, is not utilized as a part of the hydrogen source. Therefore, for the purpose of hydrogen production, this method is not sufficient. Furthermore, this process cannot avoid combustion of the feed gas and the produced gases, resulting in a decrease of selectivity to $H_2$ and/or CO.

Auto thermal reforming involves the reaction of oxygen, steam, and fuel to produce hydrogen and $CO_2$, and can be viewed as a combination of partial oxidation and steam reforming as given in equations (5) and (6). In essence, this process can be viewed as a combination of POR and HSR.

$$CH_4 + ½O_2 + H_2O \approx CO_2 + 3H_2, \Delta H°_{298} = -18.4 \text{ kJ/mol} \quad (5)$$

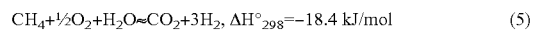

$$C_8H_{18} + 4O_2 + 8H_2O \approx 8CO_2 + 17H_2, \Delta H°_{298} = -236.7 \text{ kJ/mol} \quad (6)$$

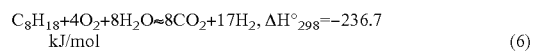

The choice of the reaction process to be used for on-board reforming depends on many factors, including the operating characteristics of the application (e.g. varying power demand, rapid startup, and frequent shutdowns) and the type of fuel cell stack. HSR is heat transfer limited and as such does not respond rapidly to changes in the power demand (i.e. "load following"). When power demand rapidly decreases, the catalyst can overheat, causing sintering, which in turn results in a loss of activity. ATR can overcome the load following limitations of HSR, because the heat required for the endothermic reaction is generated within the catalyst bed, a property that allows for more rapid response to changing power demands and faster startup.

In order to supply the large quantity of heat necessary for steam reforming, auto thermal methods involve the a priori combustion of feedstock before entry into the catalytic reformer; the heated gas is then introduced into the catalyst bed. Therefore, the heat supply is limited by the heat capacity of the reactant gases, and does not achieve essential improvements. More recently, the combustion of a part of the hydrocarbon feed has been carried out using catalytic combustion. However, since catalytic combustion is limited by the maximum catalyst-bed temperature of around 1000-1100° C., the situation is not essentially different from the a priori homogeneous combustion.

SUMMARY OF THE INVENTION

In one embodiment of the present invention, a thermo-neutral reforming process employing a multi-component composite catalyst overcomes the aforementioned problems and processes liquid hydrocarbon fuels efficiently and reliably. The present invention demonstrates that a very small amount of platinum group metal(s) can enhance the activity of the base metal-supported thermo-neutral reforming catalyst by providing hydrogen-spillover onto the catalyst surface.

The hydrogen spillover effect prevents carbon deposition on the catalyst which retards the deactivation of the catalyst. By use of a multi-component catalyst, the catalytic combustion and steam reforming functions are significantly enhanced, and furthermore, coke formation and sulfur poisoning are avoided. The heat produced from catalytic combustion induces the endothermic steam reforming of hydrocarbons on the same catalyst surface leading to ultra-rapid reforming.

In another embodiment of the present invention, a multi-component catalyst employed for the production of hydrogen-rich synthesis gas using the thermo-neutral reforming process has been successfully applied to the reforming of light and heavy petroleum-based liquid hydrocarbon fuels, including iso-octane, naphtha, kerosene, and diesel with no detectable catalyst deactivation owing to coke formation or sulfidation by the action of distinct catalytic functions of both hydrogen and oxygen spillover effects. In excess of 97% conversion of liquid hydrocarbon fuels has been achieved with high gaseous hourly space velocity.

The catalyst composition of the present invention comprises the rare earth group metal oxide(s), such as lanthanum and/or cerium oxide and mixtures thereof, a member of the group consisting of elemental nickel, a reducible compound of nickel and mixtures thereof, a member of the platinum group metals, such as elemental platinum or a compound of platinum and a member of Group IV B, such as zirconium or compounds of zirconium. Platinum group metals can be used as more than one metal, for example, two or three metals, including rhodium or compounds of rhodium and mixtures thereof. Also, a metal oxide from group VIIB of the periodic table can be used to enhance the efficiency of the thermo-neutral reforming of the liquid hydrocarbon feedstock.

In accordance with another embodiment of the present invention, there is also provided a process for the production of hydrogen-rich syngas consisting of hydrogen and carbon monoxide with less than 1.5 vol % methane and carbon dioxide. The process comprises contacting vaporized liquid hydrocarbons, air/oxygen and steam over the multi-component catalyst. The process of this invention can be carried out over a wide range of operating conditions. The level of the operating conditions are dictated by the feedstock used and the level of conversion required.

DETAILED DESCRIPTION OF THE INVENTION

Figure 1:
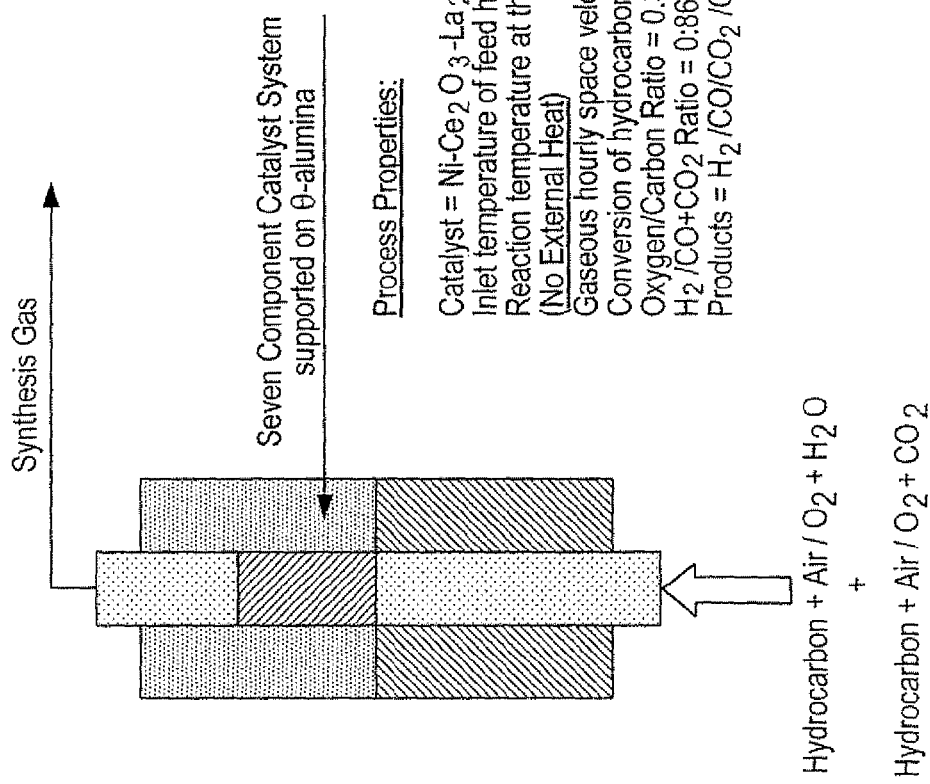
FIG. 1, is a schematic representation of the thermo-neutral reforming process of the present invention.

In a preferred embodiment of the present invention, a multi-component catalyst is employed in a process for the production of hydrogen-rich gas from heavier low-sulfur liquid petroleum fractions.

A catalyst of the present invention comprises member(s) of the rare earth group metal oxide(s), such as lanthanum and/or cerium oxide and mixtures thereof, a member selected from the group consisting of elemental nickel, a reducible compound of nickel and mixtures thereof, a member of the platinum group of metals, such as elemental platinum or a compound of platinum. Platinum group metals can be used as more than one metal, such as two or three including rhodium or compounds of rhodium and mixtures thereof. In addition, promoters from group VIIB of the periodic table, such as rhenium, can be used to enhance the efficiency of the thermo-neutral reforming of the liquid hydrocarbons feedstock.

The general composition of the catalyst of the present invention, along with the weight % range of each constituent, is as follows:
0.5-15% Ni, 0.5-10% $Ce_2O_3$, 0.5-5% $La_2O_3$, 0.1-2% Pt, 0.5-3% $ZrO_2$, 0.1-2% Rh, and 0.1-2% Re.

The remainder of the catalyst is comprised of a refractory support containing one or more of the oxides of aluminum, silicon or compounds thereof. The preferred refractory support material for the catalyst is aluminum oxide spheres having a diameter of about 2 to 4 millimeters. The surface area of the support is from about 25 to about 125 square meters per gram.

The catalyst of the invention can be prepared in accordance with various methods. The preferred method of preparation is by impregnating a preformed refractory support material with a solution of the aforementioned active metal salt precursors. The preferable refractory support is alumina spheres of diameter in the range of about 2 to about 4 millimeters.

The preferred order of impregnation is to first impregnate the platinum group metal(s) salts and then the base metal(s) salt solutions, such as nitrates, which decompose upon subsequent heat treatment to form the corresponding oxides. After the impregnation, the composite material is dried at about 120° C. at a slow rate of heating, preferably at a rate of about 0.5° C. per minute and then maintaining the temperature at 120° C. for about one hour. The temperature is then raised to about 250° C. at the same rate, and the temperature is then maintained at 250° C. for about one hour. The dried material is calcined at a temperature of about 450° to about 1160° C. The high temperature calcination is needed to prepare the catalyst to withstand high temperatures during the thermo-neutral reforming reaction of liquid hydrocarbons.

The present invention demonstrates that the introduction of a very small quantity of platinum group metal(s) can enhance the activity of the base metal supported thermo-neutral reforming catalyst by providing for the hydrogen spillover effect. The hydrogen spillover effect, as is known to those skilled in the art, prevents carbon deposition on the catalyst which retards the deactivation of the catalyst. The specific advantage of the catalyst of this invention is that the catalyst simultaneously exhibits the following qualities: (1) it is capable of complete oxidation of the hydrocarbon feed stock by consuming all the oxygen supplied, and generating a high heat of combustion reaction; (2) it is very active for the steam reforming reaction which is endothermic in nature consuming the heat generated by the oxidation reaction and providing true thermo-neutral reforming; (3) it has a very long active life without any detectable deactivation, and (4) it can process liquid hydrocarbons ranging from isooctane to diesel at a very high rate of conversion to syngas.

In addition to the multi-component catalyst employed in the process of the present invention, a high gaseous hourly space velocity (GHSV=as high as 61032 $h^{-1}$) results in a conversion in excess of 97% of liquid hydrocarbon fuels. The process of the present invention is used to produce hydrogen-rich gas from low sulfur middle distillate petroleum fractions (e.g., heavy naphtha, kerosene, diesel), as well as light petroleum fractions, such as light naptha and LPG. The process employs the multi-component catalyst discussed previously.

The catalyst formulation of the present invention is able to perform dual functions, namely, reforming and catalytic combustion, in the production of hydrogen-rich syngas from heavier hydrocarbon fractions. The thermo-neutral reforming is conducted on the same catalyst surface, upon which the combustion and steam reforming functions are configured in a good balance. The heat of combustion is then used instantaneously to supply the heat requirement directly for steam and/or $CO_2$ reforming with minimum heat loss.

As discussed previously, there are three well-known conventional reforming processes for hydrogen production, namely, auto-thermal reforming, partial oxidation reforming, and steam reforming which are completely different from the process of the present invention in terms of process conditions, reaction method, catalyst system, and process design.

In auto-thermal reforming, even the most advanced versions, two kinds of catalyst beds, i.e., combustion catalyst and steam reforming catalyst, are used in series. However, the thermal resistance of the catalyst support and catalyst ingredients limits the catalytic combustion to the maximum catalyst-bed temperature of 1000-1100° C.; a situation not essentially different from a priori homogeneous combustion.

By contrast, in the process of the present invention, which can be seen in FIG. 1, thermo-neutral reforming using the seven component catalyst is conducted on the same catalyst surface, in which the combustion function and steam reforming function are configured, in good balance. The heat of combustion is then directly used instantaneously for the heat of reforming with minimal heat loss.

Figure 2:
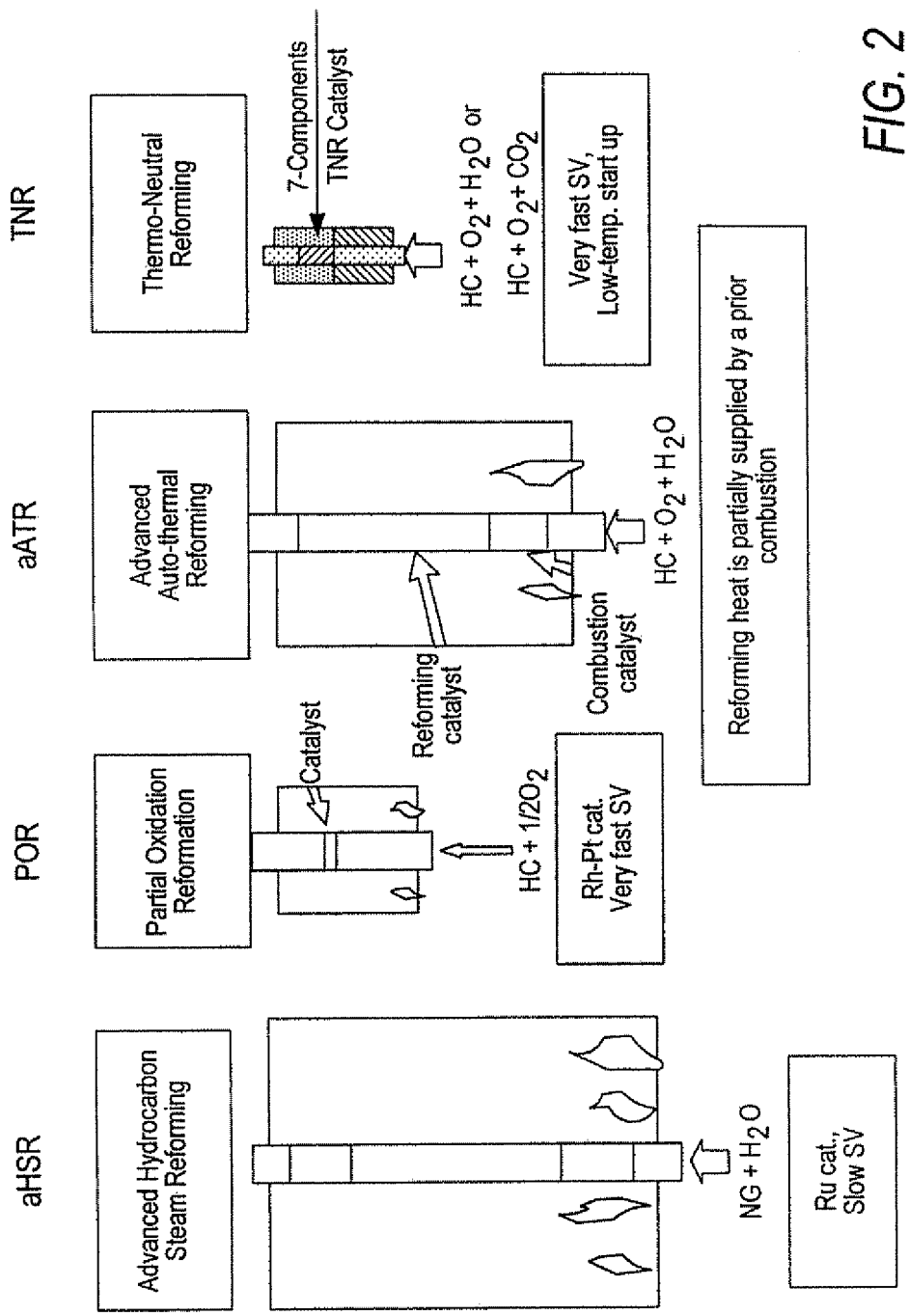
FIG. 2, is a schematic comparison of conventional types of reforming processes versus the reforming process of the present invention.

FIG. 2 illustrates the advantages of thermo-neutral reforming over other prior art reforming technologies, including hydrocarbon steam reforming, partial oxidation and autothermal reforming.

Figure 3:
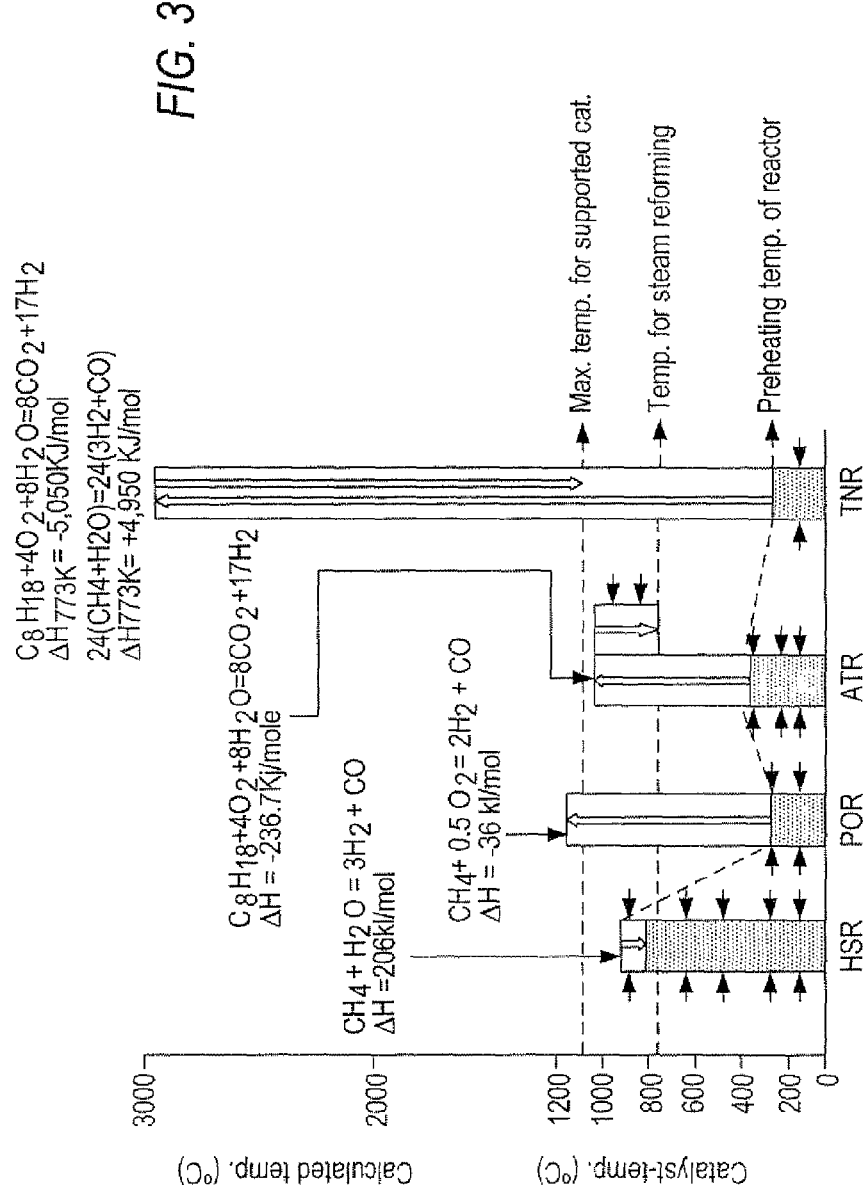
FIG. 3, is a conceptual schematic comparison of various reforming processes.

FIG. 3 depicts the advantages to be realized by the thermo-neutral reforming process of the present invention, in conceptual illustrations, showing the heat released and exchanged in the four different reactor systems.

Heat of steam reforming (HSR) in the traditional reformer is supplied from the outside of the reactor, and, therefore, a very small amount of heat can be injected to the catalyst bed. It needs a huge reactor and furnace to provide the heat.

Partial oxidation reforming (POR) of the hydrocarbons is conducted using catalytic combustion catalysts such as gauze-shaped Pt—Rh wires with extremely short (m-sec) contact times. Combustion of a portion of the hydrocarbon also occurs, and therefore, selectivity to $H_2$ and CO is apt to decrease.

Even in the most advanced auto thermal reforming (ATR) process, in principal, the rate of catalytic partial oxidation is limited up to around 1100° C. by heat elevation due to the limit of transformation temperature of the catalyst supports. As a result, the gas hour space velocity cannot be increased to any significant extent. Thus, the catalyst volume cannot be reduced significantly.

However, in thermo-neutral reforming (TNR) by catalytic combustion, the catalyst-bed temperature rises to an imaginary (virtual) temperature of more than 3000° C., but in reality the catalyst-bed temperature is forced to decrease by the largely endothermic steam reforming reaction. As a result, the catalyst-bed temperature is maintained at a safe and practical temperature range. Because of this characteristic, the reactor size can be reduced two orders of magnitude compared to traditional steam reformers.

The process of the present invention can be carried out over a wide range of operating conditions, including reaction temperatures between about 750° C. to 1000° C., pressures from about 0 to 50 psig, steam to carbon ratios from about 0 to about 3.5, oxygen to carbon ratios from about 0.35 to about 0.60, and gas hourly space velocities of about 30,000 $h^{-1}$ to about 70,000 $h^{-1}$ per hour. The feedstock used and the level of conversion required determines the conditions employed. Generally, for the production of hydrogen-rich gas, the operation is carried out at high temperature and low pressure with maximum space velocity to get a higher yield of hydrogen.

In carrying out the process of the present invention, the oxygen containing gas can be taken from the group consisting of air, oxygen or steam, and also mixtures thereof. For the thermo-neutral reforming of liquid hydrocarbons, air and/or carbon dioxide can be used, with air being the preferred gas. The hydrocarbon feedstocks can be a single hydrocarbon, such as methane, ethane, propane, butane, or mixtures thereof, including natural gas and its condensate and various petroleum fractions, such as light naphtha, heavy naphtha, kerosene, and diesel.

For the thermo-neutral reforming process of the present invention, the relative amount of steam and hydrocarbon reactants is expressed as the steam-to-carbon ratio, which is the number of moles of steam per atom of carbon in the hydrocarbon charged to the reactor. For longer catalyst life and reaction equilibrium considerations, the preferred steam-to-carbon ratio is about 2:1.

Some of the advantages to be realized by the thermo-neutral reforming process of the present invention employing the multi-component catalyst of the present invention are set forth below.

The catalyst of the present invention possesses functionalities of both catalytic combustion and steam and/or $CO_2$ reforming on the same catalyst surface. It is slightly less active than the original four component catalyst developed mainly for the reforming of light hydrocarbon fuels which is the subject of PCT/US05/47220, filed Dec. 22, 2005, which is incorporated herein by reference. The catalyst of the present invention makes it possible to reform heavier hydrocarbon fractions without deactivation or coking which may otherwise result from elevated temperatures during the highly exothermic catalytic combustion step. By virtue of the distinct spillover functions of both oxygen and hydrogen, precursors of coke formation and sulfur poisoning are oxidized and/or hydrogenated instantaneously and catalytic deactivation is prevented.

By supplying the proper ratio of fuel, air, and steam at a lower temperature range, from about 410° C. to about 420° C., than conventional steam reforming, the catalyst-bed temperature rises within a very short period of time, about 10 to about 20 sec, to a temperature of about 800° C. to about 900° C., at which temperature the steam reforming reaction progresses smoothly.

The exotherm caused by the catalytic combustion of fuel is neutralized and compensated automatically with the endotherm caused by steam and/or $CO_2$ reforming of hydrocarbons. This prevents the excessive rise of catalyst temperature and, therefore, the sintering of the catalyst metals and the transformation of the catalyst support to a non-porous state. These functions enhance catalyst stability.

The heat transfer between the exotherm and endotherm is performed directly on the same catalyst bed. As a result, the required catalytic reactor volume for liquid hydrocarbon reforming in this invention is less than 1/20 the size of a conventional steam reforming reactor, and less than 1/10 the size of an autothermal reformer. Moreover, the large furnace needed to heat the reactor, as required in conventional hydrocarbon steam reforming can be eliminated.

During steady state operation, there is no need to supply heat externally, since the heat required for the steam reforming is supplied in situ from the catalytic combustion reaction. The TNR process employing a multi-component catalyst is very fast (more than 35,000 h$^{-1}$) and produces no detectable coke formation when processing liquid hydrocarbons with low sulfur and aromatics content. The multi-component catalyst is capable of almost complete oxidation of the hydrocarbon feed stock by consuming the oxygen supplied and generating a high heat of combustion.

The multi-component catalyst is highly active for the steam reforming reaction, namely, the endothermic reaction, thereby consuming the heat generated by the oxidation reaction and providing true thermo-neutral reforming. It also has a very long active life without any detectable deactivation when used with heavier distillate petroleum feedstocks and can process liquid hydrocarbons ranging from isooctane to diesel at a very high conversion rate to produce hydrogen-rich syngas.

The multi-component catalyst can be applied over a wide range of fuels ranging from gas-based fuels, such as natural gas (NG) and liquefied petroleum gas (LPG), to petroleum-based liquid hydrocarbons, including naphtha, gasoline, kerosene and diesel. The catalyst of the present invention can also be applied to the production of fuels such as methanol, ethanol, biodiesel and synthetic fuels (synfuels). It can be applied to a wide range of applications, including synthesis gas (carbon monoxide+hydrogen) production, hydrocarbon to liquid conversion (HTL) using the Fischer-Tropsch method, methanol production, hydrogen feedstock for hydroprocessing, high purity hydrogen production for various applications, the manufacture of specialty chemicals, and the reforming of liquid hydrocarbon fuels for fuel cell applications, with capacities ranging from 100 W to several MW's using Proton Exchange Membrane Fuel Cell (PEMFC), Solid Oxide Fuel Cell (SOFC) and Molten Carbonate Fuel Cell (MCFC). These systems can be applied to small size commodities, cogeneration systems for domestic use and fuel cell vehicles.

This system can also be used to produce hydrogen rich reformate from liquid petroleum fuels for hydrogen enrichment in internal combustion engines to reduce cold-start emissions and extend the useful range for exhaust gas recycle.

The catalyst can be utilized in the thermo-neutral reforming of liquid petroleum feedstocks for large-scale refinery hydrogen production (up to 200,000 Nm$^3$/h).

EXAMPLES

All experiments were carried out in a fixed-bed flow reactor system. The reaction system consisted of gas and liquid feed sections, a preheating section, a reactor section and a product collection section. Gases were fed through mass flow controllers; liquid feeds were pumped by precision HPLC pumps. The reactor tube was 12.6 mm in diameter and was made of Haynes 230 alloy. A three-zone electric furnace, whose temperatures were monitored and controlled by temperature controllers, heated the reactor system. Thermocouples were provided to measure the inner temperature of the reactor. Water and hydrocarbons were vaporized in preheaters and were mixed with air in a static mixer before entering the reactor. The product collection section consisted of a pressure control valve, a gas-liquid separator, a liquid level controller and a product tank.

In each of the experiments hereafter, the seven component catalyst employed was 8.0% Ni, by weight, 5.0% Ce$_2$O$_3$, by weight, 2.5% La$_2$O$_3$, by weight, 0.5% Pt, by weight, 2% ZrO$_2$, by weight, 0.5% Rh, by weight, and 1.2% Re by weight. In each experiment, the prior art catalyst employed was 10% by weight of Ni, 6.0% by weight of Ce$_2$O$_3$, 1%, by weight, of Pt and 0.2%, by weight, of Rh.

In each of the experiments described below, 6 ml of the catalyst which was employed were loaded into the Haynes reactor tube described above. The catalyst bed was positioned at the center of the reactor tube, between layers of inert silicon carbide. The top portion of silicon carbide layer also served as a preheating zone. The feed mixture was heated up to 350° C. in the preheating zone. The reactor was heated up to the starting temperature of 410° C. under nitrogen flow of 20 l/h. Water was pumped into the pre-heater and vaporized, and steam was sent in at a flow rate corresponding to a steam-to-hydrocarbon feed (H$_2$O/C) molar ratio of 2:1 for all experiments. The hydrocarbon feed was then started after a sufficient amount of water had collected in the product tank. Various O$_2$/C ratios were used. The temperature in the reactor rose to about 800-900° C. in a few seconds. The experiment was run for two hours, after a steady state had been reached. A gas sample was collected and analyzed in two gas chromatographs, one equipped with TCD and the other with FID. The percent conversion and product gas composition were calculated from the GC results.

TABLE I

Experiment 1, Feedstock: heavy naphtha.

| Operating conditions | 7 Component Catalyst | Prior Art Catalyst |
|---|---|---|
| GHSV, h$^{-1}$ | 38569 | 39144 |
| Oxygen/carbon ratio | 0.434 | 0.417 |
| Steady state reaction T, ° C. | 765 | 910 |
| Results | | |
| HC conversion, % | 99.0 | 98.9 |
| H$_2$O conversion, % | 24.6 | 11.1 |
| H$_2$/(CO + CO$_2$) | 1.64 | 1.39 |
| Product Composition | | |
| H$_2$, L/H | 74.9 | 59.0 |
| CO | 16.7 | 21.4 |
| CO$_2$ | 29.1 | 20.8 |
| CH$_4$ | 1.2 | 1.0 |
| Mole % | | |
| H$_2$ | 61.5 | 57.7 |
| CO | 13.7 | 20.9 |
| CO$_2$ | 23.9 | 20.4 |
| CH$_4$ | 1.0 | 1.0 |

TABLE II

Experiment 2, Feedstock: Kerosene.

| Operating conditions | 7 Component Catalyst | Prior Art Catalyst |
|---|---|---|
| GHSV, h$^{-1}$ | 41569 | 39902 |
| Oxygen/carbon ratio | 0.479 | 0.446 |
| Steady state reaction T, ° C. | 840 | 800 |
| Results | | |
| HC conversion, % | 97.2 | 84.9 |
| H$_2$O conversion, % | 22.6 | 3.6 |
| H$_2$/(CO + CO$_2$) | 1.42 | 1.19 |
| Product Composition | | |
| H$_2$, L/H | 69.52 | 48.83 |
| CO | 23.60 | 23.48 |
| CO$_2$ | 25.42 | 17.51 |

TABLE II-continued

| Experiment 2, Feedstock: Kerosene. | | |
|---|---|---|
| Operating conditions | 7 Component Catalyst | Prior Art Catalyst |
| $CH_4$ Mole % | 0.80 | 1.19 |
| $H_2$ | 58.3 | 53.6 |
| CO | 19.8 | 25.8 |
| $CO_2$ | 21.3 | 19.2 |
| $CH_4$ | 0.67 | 1.31 |

TABLE III

| Experiment 3, Feedstock: Diesel | | |
|---|---|---|
| Operating conditions | 7 Component Catalyst | Prior Art Catalyst |
| GHSV, $h^{-1}$ | 61032 | 57943 |
| Oxygen/carbon ratio | 0.60 | 0.61 |
| Stead state reaction T, ° C. | 970 | 835 |
| Results | | |
| HC conversion, % | 99.0 | 64.0 |
| $H_2O$ conversion, % | 5.0 | 3.0 |
| $H_2/(CO + CO_2)$ | 1.20 | 0.80 |
| Product Composition | | |
| $H_2$, L/H | 72.1 | 28.7 |
| CO | 27.1 | 22.8 |
| $CO_2$ | 34.5 | 13.6 |
| $CH_4$ Mole % | 1.3 | 1.80 |
| $H_2$ | 53.4 | 42.9 |
| CO | 20.1 | 34.0 |
| $CO_2$ | 25.6 | 20.4 |
| $CH_4$ | 0.94 | 2.7 |

The catalyst of the present invention shows marked improvement over the prior art catalyst in terms of:
1. Hydrocarbon conversion;
2. Yield of hydrogen;
3. Selectivity ($H_2/(CO+CO_2)$); and
4. Higher capability of reforming heavier feedstock with no catalyst deactivation detected. For example, diesel conversion using the catalyst of the present invention was 99% vs. 64% using the 4-component prior art catalyst.

While the illustrative embodiments of the invention have been described with particularity, it will be understood that numerous other modifications will be apparent to and can be readily made by those skilled in the art without departing from the spirit and scope of the invention. Accordingly, it is not intended that the scope of the claims appended hereto be limited to the examples and descriptions set forth herein, but rather that the claims be construed as encompassing all the features of patentable novelty which reside in the present invention, including all features which would be treated as equivalents thereof by those skilled in the art to which this invention pertains.

What is claimed is:

1. A catalyst which comprises:
   0.5 to 15%, by weight, Ni; 0.5 to 10%, by weight $Ce_2O_3$; 0.5 to 5%, by weight, $La_2O_3$; 0.1 to 2.0%, by weight, Pt; 0.5 to 3%, by weight, $ZrO_2$; 0.1 to 2%, by weight, Rh, and 0.1 to 2%, by weight, Re on a single refractory support consisting of one or more oxides of aluminum or silicon for use in a thermo-neutral reforming process.

2. The catalyst of claim 1, wherein the refractory support is aluminium oxide spheres having a diameter of about 2 to 4 millimeters.

3. The catalyst of claim 2, wherein the surface area of the support is from about 25 to about 125 square meters per gram.

* * * * *